United States Patent Office 3,161,635
Patented Dec. 15, 1964

3,161,635
9α,10α-EPOXY-19-NOR-TESTOSTERONE AND PROCESS FOR ITS PRODUCTION
Gérard Nominé, Noisy-le-Sec, Robert Bucourt, Sevigne, Clichy-sous-Bois, and André Pierdet, Noisy-le-Sec, France, assignors to Roussel-UCLAF, S.A., Paris, France, a corporation of France
No Drawing. Filed Apr. 11, 1963, Ser. No. 272,204
Claims priority, application France, Dec. 13, 1960, 846,776, Patent 1,282,638
9 Claims. (Cl. 260—239.55)

This is a continuation-in-part of application Serial No. 152,064, filed November 13, 1961, now abandoned The invention relates to the novel compound, 9α,10α-epoxy-19-nor-testosterone and a process for the preparation of said compound. The invention further relates to novel intermediates for 9α,10α-epoxy-19-nor-testosterone.

In commonly assigned U.S. Patent No. 3,055,885, the preparation of 17β-esters of 9α,10α-epoxy-19-nor-testosterone and their use as intermediates in the preparation of 3-enamino-17β-acyloxy-Δ$^{1,3,5(10),9(11)}$-estratetraenes is disclosed. All attempts to saponify the 17β-esters of 9α,10α-epoxy-19-nor-testosterone by the usual process to form 9α,10α-epoxy-19-nor-testosterone were unsuccessful due to the reactivity of the 9α,10α-epoxide which is conjugated to an ethylenic double bond conjugated to a carbonyl function.

It is an object of the invention to provide the novel compound, 9α,10α-epoxy-19-nor-testosterone.

It is another object of the invention to provide a process for the preparation of 9α,10α-epoxy-19-nor-testosterone.

It is a further object of the invention to provide novel intermediates for 9α,10α-epoxy-19-nor-testosterone and particularly:

A. 9α,10α-epoxy-17β-acyloxy-Δ$^4$-estrene-3ξ-ol
B. 9α,10α-epoxy-Δ$^4$-estrene-3ξ,17β-diol It is an additional object of the invention to provide a novel process for the preparation of Δ$^{9(11)}$-estradiol.

These and other objects and advantages of the invention will become obvious from the following detailed description.

The process of the invention comprises reducing 9α,10α-epoxy-17β-acyloxy-Δ$^4$-estrene-3-one wherein the acyl radical is the acyl of an organic carboxylic acid having 1 to 18 carbon atoms to form 9α,10α-epoxy-17β-acyloxy-Δ$^4$-estrene-3ξ-ol, saponifying the latter to form 9α,10α-epoxy-Δ$^4$-estrene-3ξ,17β-diol, oxidizing the latter to form 9α,10α-epoxy-19-nor-testosterone and recovering the latter.

A preferred mode of the process of the invention comprises reducing 9α,10α-epoxy-17β-acyloxy-Δ$^4$-estrene-3-one with an alkali metal borohydride, preferably sodium borohydride, in an aqueous inert organic solvent, preferably a mixture of water and tetrahydrofuran to form 9α,10α-epoxy-17β-acyloxy-Δ$^4$-estrene-3ξ-ol, reacting the latter with an organic or inorganic base preferably an alkali metal hydroxide, such as potassium hydroxide in a lower alkanol to form 9α,10α-epoxy-Δ$^4$-estrene-3ξ,17β-diol, oxidizing the latter with manganese dioxide in an inert organic solvent to form 9α,10α-epoxy-19-nor-testosterone and recovering the latter. The reaction scheme is illustrated in Table I.

TABLE I

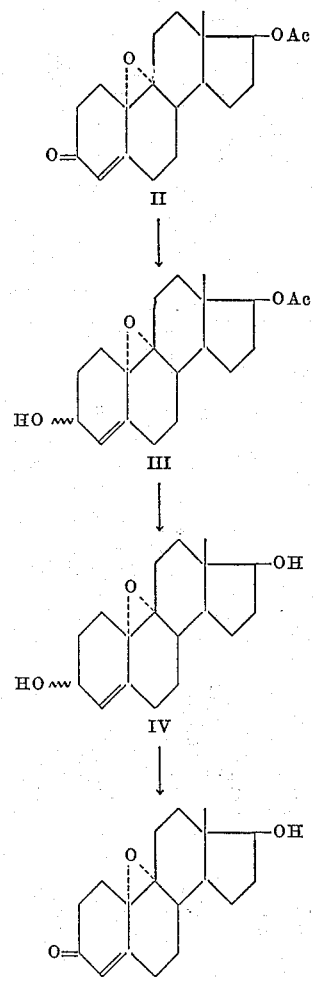

Ac is the acyl radical of an organic carboxylic acid having 1 to 18 carbon atoms.

9α,10α-epoxy-19-nor-testosterone is a useful intermediate for the preparation of Δ$^{9(11)}$-estradiol which compound and its uses are described in U.S. Patent No. 2,885,413. By heating 9α,10α-epoxy-19-nor-testosterone under alkaline conditions, such as in the presence of an alkali metal hydroxide in a lower alkanol followed by acidification, the 9α,10α-epoxide is opened with dehydration and aromatization. The probable reaction mechanism of this reaction is illustrated in Table II.

TABLE II

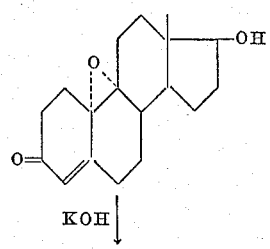

TABLE II—Continued

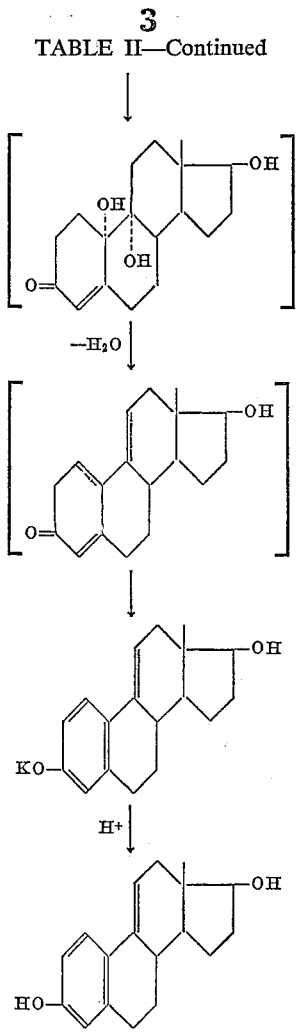

The starting materials, 9α,10α-epoxy-17β-acyloxy-Δ⁴-estrene-3-ones wherein the acyl radical is the acyl of an organic carboxylic acid having 1 to 18 carbon atoms, are prepared as described in U.S. Patent 3,055,885 by cyclizing a 3β-methyl-7-oxo-8β-(3'-oxobutyl)-8α,9α-epoxy-3,4-[3'β - acyloxycyclopentano(2',1')] - decahydronaphthalene under alkaline conditions.

In the following examples there are illustrated several preferred embodiments to illustrate the invention. However, it should be understood that the invention is not intended to be limited to the specific embodiments.

EXAMPLE I

*Saponification of 9α,10α-Epoxy-17β-Benzoyloxy Δ⁴-Estrene-3-One*

STEP A.—REDUCTION 4.4 grams of 9α,10α-epoxy-17β-benzoyloxy-Δ⁴-estrene-3-one having a melting point of 173° C. and a specific rotation $[\alpha]_D^{20}=+112°$ (c.=1% in methanol) (obtained according to the process described in U.S. Patent No. 3,055,885), were introduced into 18 cc. of tetrahydrofuran. 0.1 gram of sodium borohydride in 4 cc. of water was added under an atmosphere of nitrogen and the reaction mixture was agitated for a period of two hours at a temperature of 0°. The mixture was concentrated to a small volume under vacuum. 20 cc. of water were added and the mixture extracted with ether. The extracts, after washing with water and drying over sodium sulfate, furnished, after evaporation to dryness, 0.435 gram of raw 9α,10α-epoxy-17β-benzoyloxy-Δ⁴-estrene-3ξ-ol which was purified by recrystallization from methanol and ethyl acetate.

The purified product had a melting point of 204.5° and a specific rotation $[\alpha]_D^{20}=+116°$ (c.=0.5% in ethanol).

The product occurred in the form of colorless prismatic needles, soluble in acetone, ethyl acetate and methanol.

*Analysis.*—$C_{25}H_{30}O_4$; molecular weight=394.5. Calculated: C, 76.10%; H, 7.66%. Found: C, 76.0%; H, 7.5%.

This product is not described in the literature.

STEP B.—SAPONIFICATION 600 mg. of 9α,10α-epoxy-17β-benzoyloxy-Δ⁴-estrene-3ξ-ol were introduced into 60 cc. of normal methanolic potassium hydroxide and heated to reflux for a period of one hour. The mixture was concentrated to a small volume, water was added, and the mixture was iced. The precipitated product was vacuum filtered. 425 mg. of 9α,10α-epoxy-Δ⁴-estrene-3ξ,17β-diol were recovered which were purified by recrystallization from isopropyl ether.

The purified product had a melting point of 202° C. and a specific rotation $[\alpha]_D^{20}=+65°$ (c.=0.4% in methanol). The product occurred in the form of a white solid and was slightly soluble in isopropyl ether and insoluble in water.

*Analysis.*—$C_{18}H_{26}O_3$; molecular weight=290.39. Calculated: C, 74.4%; H, 9.02%. Found: C, 74.4%; H, 9.0%.

This product is not described in the literature.

STEP C.—OXIDATION 150 mg. of 9α,10α-epoxy-Δ⁴-estrene-3ξ,17β-diol were introduced into 30 cc. of dichloroethane. 750 mg. of manganese dioxide were added and the mixture was agitated at room temperature for a period of two hours. The mixture was vacuum filtered and the manganese dioxide washed. By distillation of the filtrate to dryness, 150 mg. of raw 9α,10α-epoxy - Δ⁴ - estrene-17β-ol-3-one (9α,10α-epoxy-19-nor-testosterone) was obtained. It was purified by recrystallization from isopropyl ether and a product melting at 150–151°C. and having a specific rotation $[\alpha]_D^{20}=+56°$ (c.=1.05% in methanol), was obtained.

*Analysis.*—$C_{18}H_{24}O_3$; molecular weight=288.37. Calculated: C, 74.97%; H, 8.38%. Found: C, 74.8%; H, 8.6%. Ultraviolet spectrum in ethanol: λ max. 244 mμ, ε=13,300.

This product is not described in the literature.

EXAMPLE II

*Preparation of $\Delta^{9(11)}$-Estradiol*

In a 3-necked balloon flask, 0.250 gm. of 9α,10α-epoxy-Δ⁴-estrene-17β-ol-3-one and 2.5 cc. of a solution containing 13 gm. of potassium hydroxide and 100 cc. of methanol were introduced under an atmosphere of nitrogen. The mixture was heated to reflux and maintained at this temperature for a period of 35 minutes and then was allowed to return to room temperature. The reaction mixture was brought to dryness under vacuum and the dry residue was taken up by a mixture of 2.5 cc. of water and ice. The suspension thus obtained was neutralized by the addition of hydrochloric acid. An abundant precipitate appeared which was separated by filtration, vacuum filtered, washed with water and dried under vacuum. 0.230 gm. (yield of 95%) of $\Delta^{9(11)}$-estradiol melting at 130° C., then 184° C. were obtained.

The product was purified by subjecting it to chromatography through 100 volumes of magnesium silicate (60–200 mesh particle size) and eluting the column with pure methylene chloride, then methylene chloride containing increasing concentrations of acetone. The elution with a mixture containing 1% of acetone gave nothing. The elution with the mixture containing 2.5% of acetone furnished 180 mg. of pure product melting at 190° C. and having a specific rotation $[\alpha]_D^{20}=+134.40$ (c.=0.5% in methanol). For analysis, the product was recrystallized from isopropyl ether by heating and cooling. The melting point remained unchanged.

$\Delta^{9(11)}$-estradiol occurred as a colorless crystallized solid compound slightly soluble in alkalis. The compound has already been described by J. S. Mills in J. Am. Chem. Soc. 82 (1960), 5882, but with slightly different constants.

*Analysis.*—$C_{18}H_{22}O_2$; molecular weight=270.36. Calculated: C, 79.96%; H, 8.2%. Found: C, 79.6%; H, 7.9%.

The ultraviolet spectra and the magnetic resonance nuclear spectra are in accord with the structure.

Various modifications of the process of the present invention may be made without departing from the spirit or scope thereof and it is to be understood that the inventin is to be limited only as defined in the appended claims.

We claim:

1. $9\alpha,10\alpha$ - epoxy-$17\beta$-benzoyloxy-$\Delta^4$-estrene-$3\xi$-ol having a melting point of 204.5° C. and a specific rotation $[\alpha]_D^{20}=+116°$ (c.=0.5% in ethanol).

2. $9\alpha,10\alpha$-epoxy-$\Delta^4$-estrene-$3\xi,17\beta$-diol having a melting point of 202° C. and a specific rotation $[\alpha]_D^{20}=+65°$ (c.=0.4% in methanol).

3. A process for the preparation of $9\alpha,10\alpha$-epoxy-19-nor-testosterone which comprises reducing $9\alpha,10\alpha$-epoxy-$17\beta$-acyloxy-$\Delta^4$-estrene-3-one wherein the acyl radical is the acyl radical of an organic hydrocarbon carboxylic acid having 1 to 18 carbon atoms to form $9\alpha,10\alpha$-epoxy-$17\beta$-acyloxy-$\Delta^4$-estrene-$3\xi$-ol, saponifying the latter under alkaline conditions to form $9\alpha,10\alpha$-epoxy-$\Delta^4$-estrene-$3\xi,17\beta$-diol, oxidizing the latter to form $9\alpha,10\alpha$-epoxy-19-nor-testosterone and recovering the latter.

4. The process of claim 3 wherein the reduction is effected with an alkali metal borohydride.

5. The process of claim 3 wherein the oxidation is effected with manganese dioxide.

6. A process for the preparation of $9\alpha,10\alpha$-epoxy-19-nor-testosterone which comprises reducing $9\alpha,10\alpha$-epoxy-$17\beta$-acyloxy-$\Delta^4$-estrene-3-one wherein the acyl radical is the acyl radical of an organic hydrocarbon carboxylic acid having 1 to 18 carbon atoms with sodium borohydride in an aqueous inert organic solvent to form $9\alpha,10\alpha$-epoxy-$17\beta$-acyloxy-$\Delta^4$-estrene-$3\xi$-ol, reacting the latter in a lower alkanol with an alkali metal hydroxide to form $9\alpha,10\alpha$-epoxy-$\Delta^4$-estrene-$3\xi,17\beta$-diol, oxidizing the latter with manganese dioxide in an inert organic solvent to form $9\alpha,10\alpha$-epoxy-19-nor-testosterone and recovering the same.

7. A process for the preparation of $\Delta^{9(11)}$-estradiol which comprises reducing $9\alpha,10\alpha$-epoxy-$17\beta$-acyloxy-$\Delta^4$-estrene-3-one wherein the acyl radical is the acyl radical of an organic hydrocarbon carboxylic acid having 1 to 18 carbon atoms to form $9\alpha,10\alpha$-epoxy-$17\beta$-acyloxy-$\Delta^4$-estrene-$3\xi$-ol, saponifying the latter under alkaline conditions to form $9\alpha,10\alpha$-epoxy-$\Delta^4$-estrene-$3\xi,17\beta$-diol, oxidizing the latter to form $9\alpha,10\alpha$-epoxy-19-nor-testosterone and heating the latter up to reflux temperatures under alkaline conditions to form $\Delta^{9(11)}$-estradiol.

8. A process for the preparation of $\Delta^{9(11)}$-estradiol which comprises reducing $9\alpha,10\alpha$-epoxy-$17\beta$-acyloxy-$\Delta^4$-estrene-3-one wherein the acyl radical is the acyl radical of an organic hydrocarbon carboxylic acid having 1 to 18 carbon atoms with sodium borohydride in an aqueous inert organic solvent to form $9\alpha,10\alpha$-epoxy-$17\beta$-acyloxy-$\Delta^4$-estrene-$3\xi$-ol, reacting the latter in a lower alkanol with an alkali metal hydroxide to form $9\alpha,10\alpha$-epoxy-$\Delta^4$-estrene-$3\xi,17\beta$-diol, oxidizing the latter with manganese dioxide in an inert organic solvent to form $9\alpha,10\alpha$-epoxy-19-nor-testosterone, heating the latter up to reflux temperatures in the presence of an alkali metal hydroxide in a lower alkanol followed by neutralization to form $\Delta^{9(11)}$-estradiol and recovering the latter.

9. A compound selected from the group consisting of $9\alpha,10\alpha$-epoxy-$\Delta^4$-estrene-$3\xi,17\beta$-diol having a melting point of 202° C. and a specific rotation $[\alpha]_D^{20}=+65°$ (c.=0.4% in methanol) and its $17\beta$-acyl esters wherein the acyl radical is derived from an organic hydrocarbon carboxylic acid having 1 to 18 carbon atoms.

References Cited by the Examiner

Ayphassorho et al.: "Compt. Rend. Acad. Sci.," July 1961, pages 684–686 relied on.

LEWIS GOTTS, *Primary Examiner.*